United States Patent
Kayashima et al.

(10) Patent No.: US 7,194,530 B2
(45) Date of Patent: Mar. 20, 2007

(54) SYSTEM FOR MANAGING A NETWORK

(75) Inventors: Makoto Kayashima, Yokohama (JP); Hiromi Isokawa, Fujisawa (JP); Yasuji Ishida, Kawasaki (JP); Toru Senoo, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 653 days.

(21) Appl. No.: 10/212,709

(22) Filed: Aug. 7, 2002

(65) Prior Publication Data
US 2003/0055939 A1  Mar. 20, 2003

(30) Foreign Application Priority Data
Aug. 27, 2001  (JP) ............... 2001-255451

(51) Int. Cl.
*G06F 15/16* (2006.01)
(52) U.S. Cl. ...................... 709/223; 709/221
(58) Field of Classification Search ................ 709/223, 709/224, 202–203, 217–221
See application file for complete search history.

(56) References Cited

U.S. PATENT DOCUMENTS 6,449,642 B2 *  9/2002  Bourke-Dunphy et al. . 709/222
7,054,924 B1 *  5/2006  Harvey et al. .............. 709/220
2002/0124061 A1 *  9/2002  Mossman .................... 709/220

FOREIGN PATENT DOCUMENTS

JP  2000-244495  9/2000

OTHER PUBLICATIONS

Marchal, Benoit; Applied XML Solutions; Sep. 2000; Sans Publishing; Chapters 2 and 4.*
Cameron, Jamie; WEBMIN: A Web-Based System Administration Tool for Unix; Jun. 2000; Proceedings of FREENIX Track: 2000 USENIX Annual Technical Conference.*
BELL LABS Technical Journal vol. 5, No. 4, Oct.-Dec. 2000, pp. 31-43.

* cited by examiner

*Primary Examiner*—Moustafa M. Meky
(74) *Attorney, Agent, or Firm*—McDermott Will & Emery LLP

(57) ABSTRACT

In an integrated management system for providing a network system having a plurality of computers with a security function and managing a plurality of target products, implementation of the management system itself is facilitated by providing the management system with setting information templates prepared for respective target products, a management program for managing setting information files of target products actually used in a target network, an edit program for editing setting information files, and an install program for installing setting information files created by using the management program and the edit program in respective target devices.

4 Claims, 8 Drawing Sheets

```
<?xml-stylesheet type="text/xsl"href="rulebases.xsl"?>
<xmlroot>
<title>FireWall-1 rulebases.fws />
 <template>
  <rulebase>
   <source />
   <destination />
   <service />
   <action accept />
   <action deny />
   <logdata-type value="Long" flg="1" />
   <logdata-type value="Short" flg="0" />
   <logdata-type value="Int" flg="0" />
   <logdata-type value="Char" flg="0" />
   <install-point />
   <time />
  </rulebase>
  <property>
   <check-timing value="inbound" flg="1" />
   <check-timing value="outbound" flg="0" />
   <check-timing value="eitherbound" flg="0" />
   <timeout value="3600" />
  </property>
 </template>
</xmlroot>
```

EXAMPLE OF DEFAULT VALUE

<timeout value="3600" /> — 302

EXAMPLE OF CASE WHERE
IS NO DEFAULT VALUE

<source /> — 303

EXAMPLE OF PATTERN SELECTION

<action> value="accept" flg="0" />
<action> value="deny" flg="1" /> — 304

```
<?xml version="1.0" encoding="Shift_JIS"?>
<?xml-stylesheet type="text/xsl"href="rulebases.xsl"?>
<xmlroot>
<title>FireWall-1 rulebases.fws />
 <template>
  <rulebase>
   <source> 192.168.0.1 />
   <destination> 192.168.0.10 />
   <service> ftp />
   <action> accept />
   <logdata-type> Long />
   <install-point> lemon.sdl.hitachi.co.jp />
   <time> Any />
  </rulebase>
  <property>
   <check-timing> name="inbound" selected="yes" />
   <timeout> 3600 />
  </property>
 </template>
</xmlroot>
```

SYSTEM FOR MANAGING A NETWORK

BACKGROUND OF THE INVENTION

The present invention relates to a technique for implementing a management system that manages devices used to provide a network system including a plurality of computers with security functions.

Heretofore, various management systems for managing a plurality of devices have been developed for network systems each including a plurality of computers.

For example, a network management system described in JP-A-2000-244495 provides a mechanism for automatically generating and setting security setting of individual routers and firewall apparatuses included in a system.

In W. C. Goers and M. R. Brenner, "Implementing a Management System Architecture Framework," Bell Labs Tech. J., Vol. 5, No. 4, October–December 2000, pp. 31–43, there is a description concerning implementation of an integrated management system for managing network devices by using a Web browser.

These techniques aim at providing techniques for efficiently managing a plurality of devices included in a network system. However, for newly adding a device that is not a management subject, as a management subject, it is necessary to improve the management system.

As devices that form a network system and software that operate on the devices, various new products (hardware, software, or both of them) are developed one after another. In order to make those new products new subjects of the management, therefore, it is necessary for the management system to be frequently improved.

The conventional management systems, which do not assume expansion of the network time and additional costs to add new products to the management system.

SUMMARY OF THE INVENTION

The present invention provides an integrated management system having the following components:

(1) a setting information template (referred to also as model) for forming the basis of setting a target product (hardware or software), and a management program for managing setting information files of target products actually used in a target network;

(2) an edit program for editing a setting information file, which is desired to be a dedicated edit program prepared for each target product; and (3) an install program for installing a setting information file created by using the management program and the edit program in each target device, which is desired to a dedicated install program prepared for each target product.

It is desired that the management program of (1) manages the edit program and the install program every target product.

In the case where the target product is software, a version change due to improvement or the like might cause a partial change in setting contents and consequently a version up of the management program as well becomes necessary in some cases. According to the present invention, it becomes possible to reduce the labor required for making a new device that does not correspond to the management system or software of a new version a target. And it becomes easy to expand the management system.

Other objects, features and advantages of the invention will become apparent from the following description of the embodiments of the invention taken in conjunction with the accompanying drawings.

BRIEF DESCRIPTION OF THE DRAWINGS

FIG. 3 is a diagram showing an example of a setting information template used by an integrated management system;

FIG. 4 is a diagram showing an example of a setting information file used by an integrated management system;

DETAILED DESCRIPTION OF THE EMBODIMENTS

Hereafter, embodiments of the present invention will be described by taking the case where software products are management target products as an example with reference to FIGS. 1 to 8.

Figure 1:
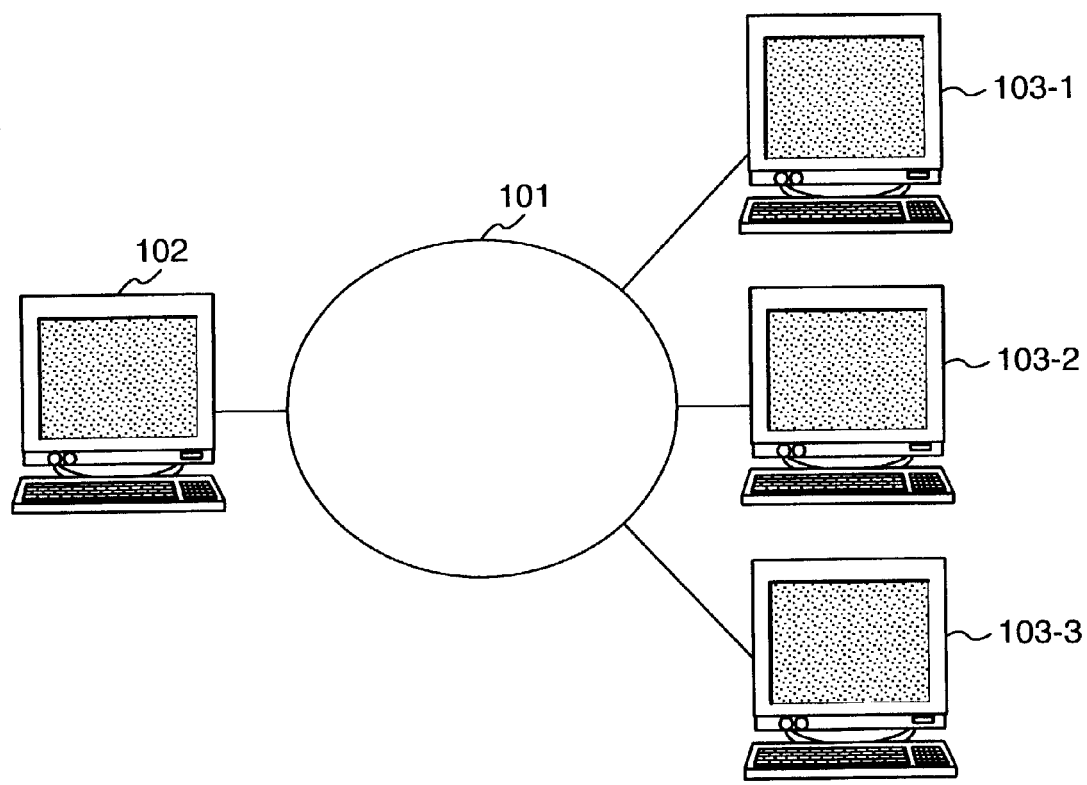
FIG. 1 is a diagram showing a general configuration of an integrated network management system.

FIG. 1 is a diagram showing a general configuration of an integrated management system of the present embodiment. The integrated management system includes a network 101, an integrated management server 102, target servers 103-1 to 103-3. The target servers as a whole are generally denoted by 103.

In the present embodiment, not only a local network but also a wide area network such as the Internet can be used as the network 101.

Figure 2:
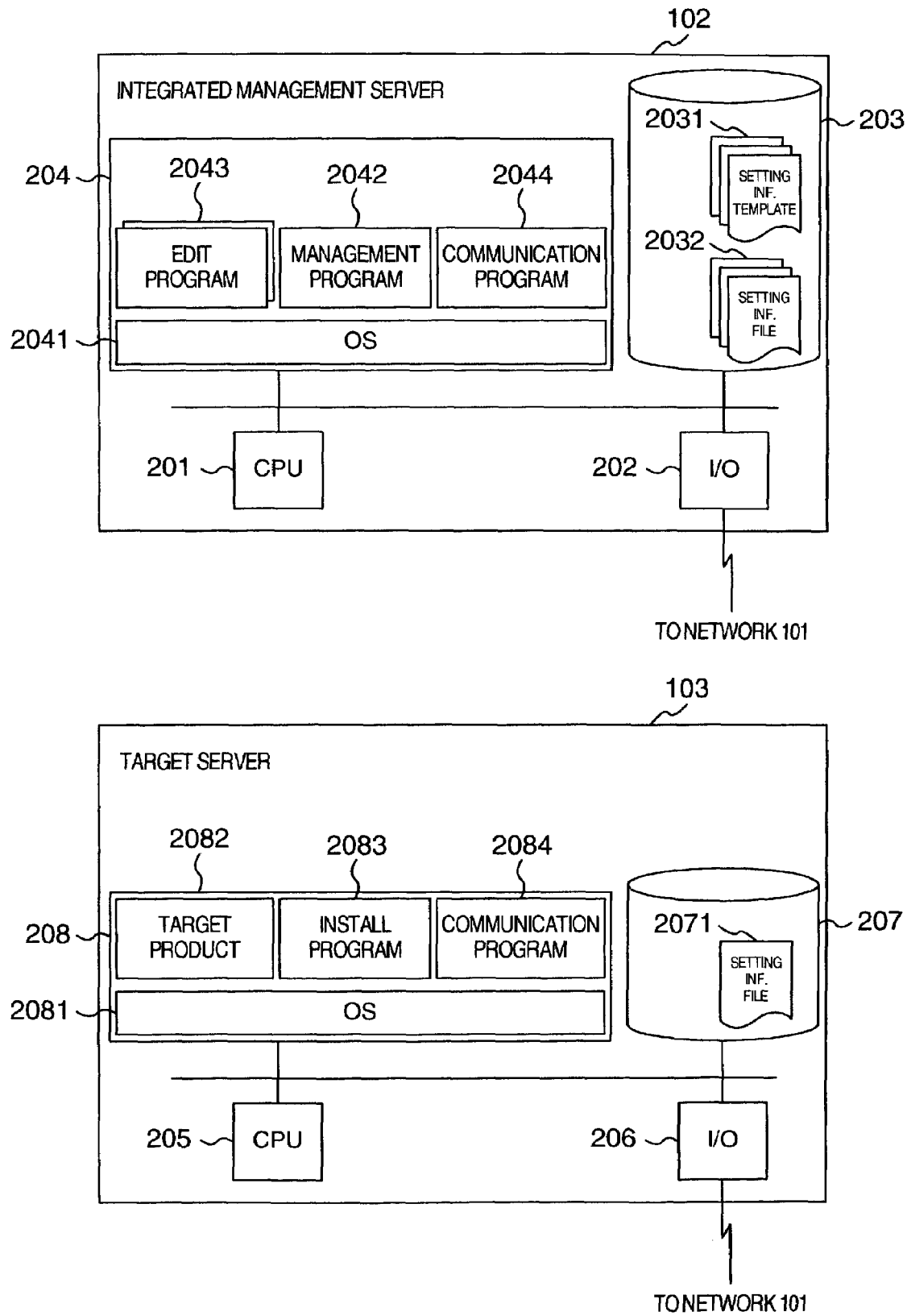
FIG. 2 is a diagram showing configurations of an integrated management server and a target server.

FIG. 2 is a diagram showing configurations of the integrated management server 102 and the target server 103.

In the configuration of the integrated management server 102, reference numeral 201 denotes a CPU and 202 denotes a network communication interface. Reference numeral 203 denotes an external storage device. The external storage device 203 stores at least one setting information template 2031 each prepared per target product, and at least one setting information file 2032 of target products actually used in the target network.

The setting information template 2031 is for creating the setting information file 2032. In the setting information file 2032, configuration item values of the setting information template 2031 have been fixed.

Reference numeral 204 denotes a memory. An operating system (OS) 2041 is stored in the memory 204. As programs operating on the operating system 2041, there are disposed in the memory 204 a management program 2042 for managing the setting information template 2031 and the setting information file 2032, at least one edit program 2043 for editing the setting information file 2032 each prepared per target product, and a communication program 2044 to be used for communication with a target server.

In the configuration of the target server 103, reference numeral 205 denotes a CPU, and reference numeral 206 denotes a network communication interface. Reference numeral 207 denotes an external storage device. A setting information file 2071 is stored in the external storage device 207. Reference numeral 208 denotes a memory. An operating system (OS) 2081 is disposed in the memory 204. Target products 2082, an install program 2083 for installing the setting information file in the target product 2082, and a communication program 2084 to be used for communication with the integrated management server are on the memory 208 as programs operating under the operating system 2081.

Programs to be executed by the CPU 201 and the CPU 205 may be introduced into the integrated management server 102 or the target server 103 via a storage medium or a communication medium on the network.

The setting information template 2031 is a collection of configuration items of the target products 2082. For example, as exemplified in 301 of FIG. 3, the setting information template 2031 can be defined as a file of XML (eXtensible Markup Language) format.

In this case, each configuration item can be defined as an element of the XML. Each item name can be associated with a tag, and its item value can be associated with a text node. A format of an element of the XML corresponding to each configuration item is as follows:

<item name>value="configuration item value"</item name>

If there is a default value as a configuration item value, the default value is entered in the configuration item value as shown in 302. If the default value is not determined, a blank is entered in the configuration item value as shown in 303. If patterns of a value which can be assumed as a configuration item value are determined and a selection is effected out of them, then elements of the same tag are arranged a plurality of times and entered as shown in 304. As for an element selected by a default, flg="1" is added after the configuration item value as an attribute value at this time. For other elements, flg="0" is added. As a result, it becomes possible to identify the default value.

The XML format file 301 shown in FIG. 3 is an example of the setting information template for a firewall system. The XML format file 301 includes a "rulebase" tag that defines information concerning an access control rule, and a "property" tag that defines information concerning a property.

The "rulebase" tag includes elements according to the following tags:
   source tag, which defines a transmission source IP address;
   destination tag, which defines a transmission destination tag;
   service tag, which defines a TCP/IP service name;
   action tag, which defines an action to be effected when the IP address and service match between the transmission source and the transmission destination, and which is "accept" when accepting communication, and "deny" when denying communication;
   logdata-type tag, which defines a type of data output as a log;
   install-point tag, which specifies a computer that executes the access control rule; and
   time tag, which specifies an effective time zone of the rule.

The "property" tag includes elements according to the following tags:
   check-timing tag, which specifies rule check timing in internal processing of the firewall; and
   timeout tag, which specifies time of connection timeout.

In the setting information file 2032, configuration item values of the setting information template 2031 have been fixed. For example, as exemplified in 401 of FIG. 4, the setting information file 2032 can be defined as an XML format file.

In the case of a configuration item having no default value as shown in 303 of FIG. 3 in the setting information file 2032, rewriting is conducted so as to have the default value filled in.

In the case of a configuration item for which patterns of a value which can be assumed as a configuration item value are determined and a selection is effected out of them, flg="1" is added to the selected element as an attribute value and flg="0" is added to other elements. As a result, it becomes possible to identify the selected value.

In the setting information file 2032, it is also possible to newly define and use an attribute value in order to describe setting information.

Figure 5:
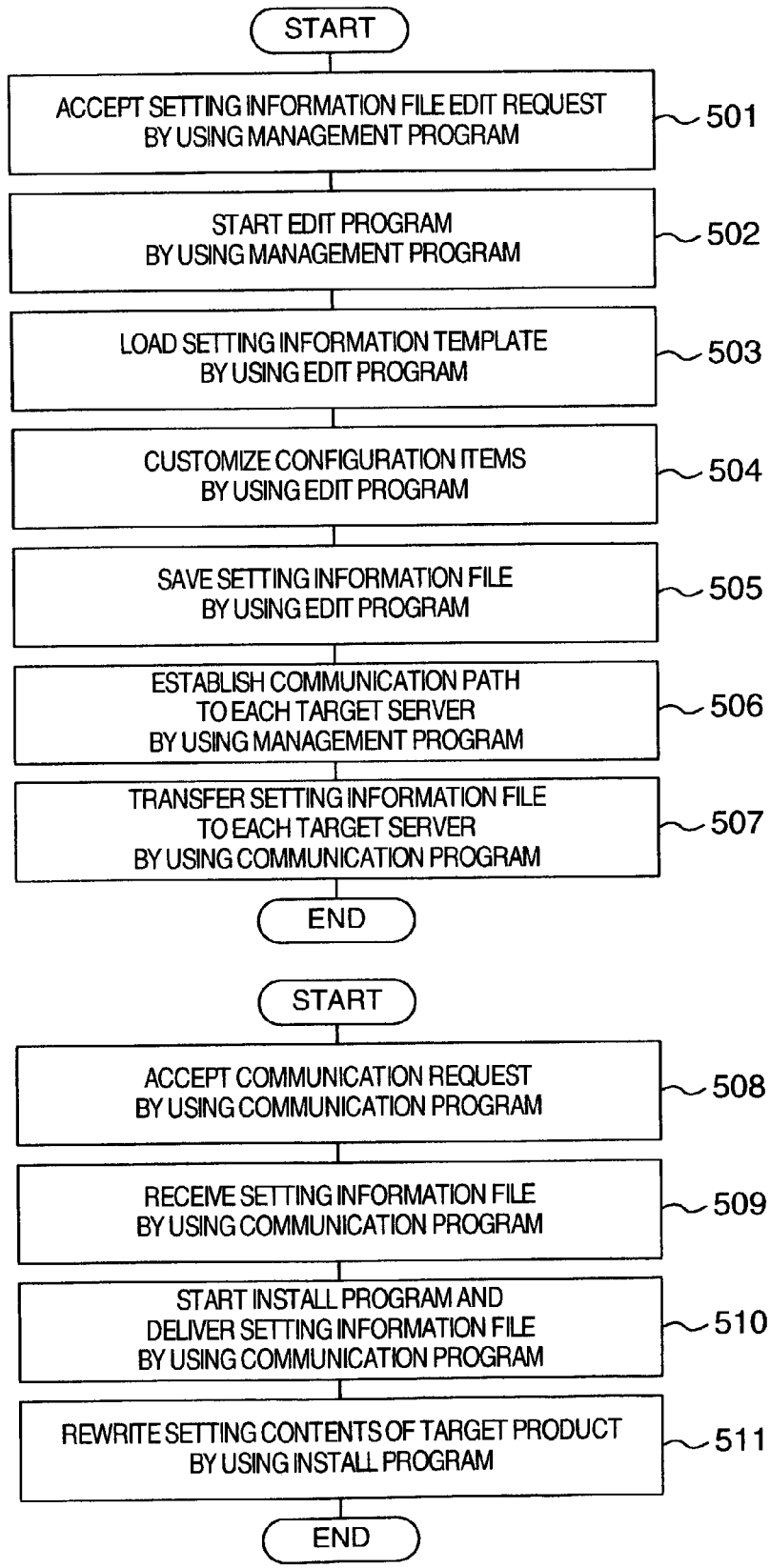
FIG. 5 is a diagram showing a flow of processing for installing a setting information file of a target product.

FIG. 5 is a diagram showing a flow of processing conducted when installing a setting information file of the target product 2082 by using the integrated management system of the present embodiment.

In accordance with a request from a network manager, who is a user, the integrated management system conducts the following series of operations on the integrated management server 102:

reference numeral 501 denotes a step at which the management program 2042 accepts an edit request of the setting information file 2032 of the target product 2082 from a user;

reference numeral 502 denotes a step at which the management program 2042 starts the edit program 2043 corresponding to the target product 2082;

reference numeral 503 denotes a step at which the edit program 2043 loads the setting information template 2031 of the target product 2082 from the external storage device 203;

reference numeral 504 denotes a step at which the user customizes configuration items of the target product 2082 by using the edit program 2043;

reference numeral 505 denotes a step at which the edit program 2043 saves the setting information file 2032 of the target product 2082;

reference numeral 506 denotes a step at which the management program 2042 starts the communication program 2044, and establishes a communication path to each target server 103; and reference numeral 507 denotes a step at which the communication program 2044 transfers the setting information file 2032 saved at the step 505 to each target server 103.

Furthermore, in the integrated management system, each target server 103 previously starts the communication program 2084, which accepts a communication request from the integrated management server 102, and conducts the following series of operations:

reference numeral 508 denotes a step at which the communication program 2084 accepts a communication request from the integrated management server 102;

reference numeral 509 denotes a step at which the communication program 2084 receives the setting information file 2032 of the target product 2082;

reference numeral 510 denotes a step at which the communication program 2084 starts the install program 2083 and delivers the received setting information file 2032 to the install program 2083; and reference numeral 511 denotes a step at which the install program 2083 rewrites the setting contents of the target product 2082.

By carrying a series of operations shown in FIG. 5, setting operations of a target product can be effected in an integrated management system of the present embodiment.

The edit program 2043 of the present embodiment is a program that supports the user in customizing the setting values of configuration items described in the setting information template 2031. A configuration item and an edit screen in which the setting default value (initial value) is previously set are displayed on a computer used by the user.

If the setting information template 2031 is using the XML format, then it is also possible to convert the layout of a displayed screen to an HTML format with the XSL (eXtensible Stylesheet Language) and construct an edit screen on the Web browser, by using the Web technique.

Figure 6:
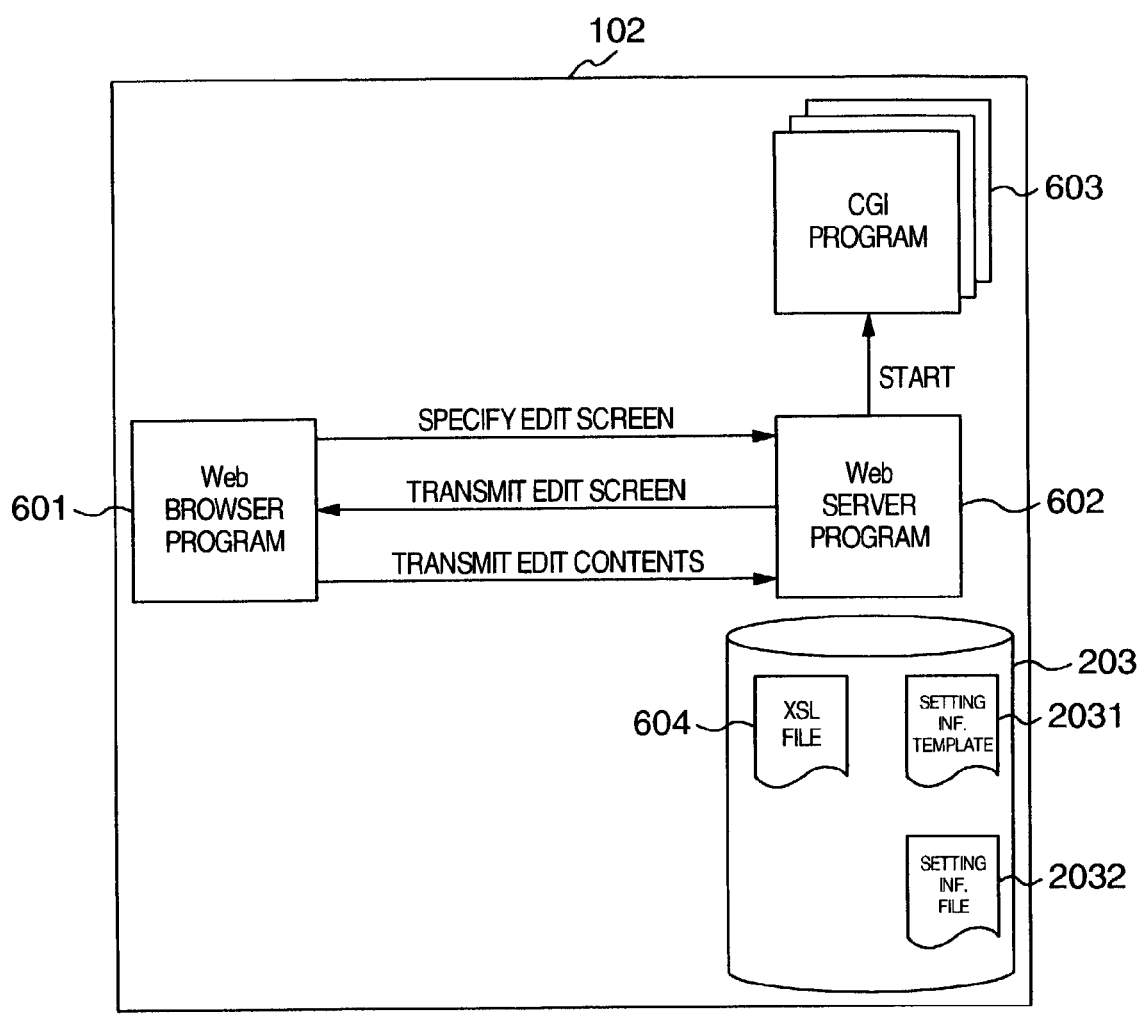
FIG. 6 is a diagram showing a configuration method of an edit program implemented by using a Web technique.

FIG. 6 is a diagram showing a construction method of the edit program 2043 implemented on the integrated management server 102 by using such a Web technique.

Reference numeral 601 denotes a Web browser program, 602 a Web server program, 603 at least one CGI program started by the Web server program 602, and 604 an XSL file for creating the screen layout. The Web server program 602, the CGI program 603, and the XSL file 604 are implemented on the integrated management server 102.

The Web browser program 601 may be disposed on another client computer that can communicate with the integrated management server with the TCP/IP.

If the URL of the setting information template 2031 of the XML format is specified in the Web browser program 601, then the Web server program 602 transmits the setting information template 2031 and the XSL file 604 to the Web browser program 601. The Web browser program 601 interprets the setting information template 2031 in accordance with the contents of the XSL file 604, and generates and displays a form screen for editing the configuration items. In the form screen, items for starting the CGI program 603 are arranged. The user can start a specified CGI program 603 by selecting an item.

As for the CGI program 603, there are a program for transferring a local file to the integrated management server 102, a program for outputting parameters of the configuration items edited on the form to the setting information file 2032, and a program for calling the communication program 2044 and transferring the setting information file 2032 to the target server 103.

Figure 7:
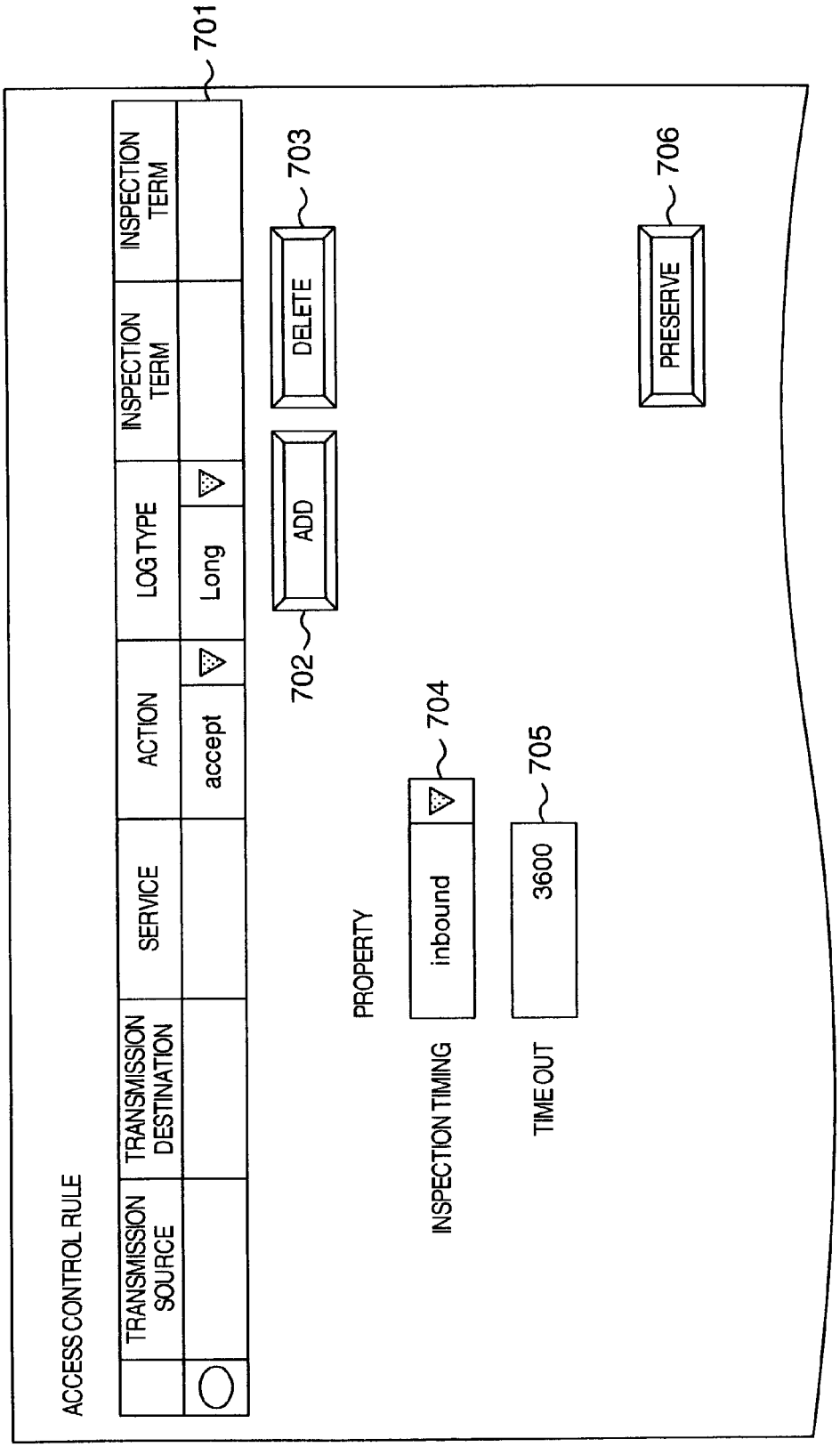
FIG. 7 is a diagram showing an example of a screen used by an edit program corresponding to an XML format file.

FIG. 7 is a diagram showing an example of a screen used by the edit program 2043 corresponding to the XML format file 301 as the setting information template 2031.

Reference numeral 701 denotes a list for describing the access control rule. Reference numeral 702 denotes a button for adding an entry of the access control rule. Reference numeral 703 denotes a button for deleting an entry of the access control rule. If the addition button 702 is depressed, a CGI program 603 for adding one entry of the access control rule is started.

Furthermore, the list 701 has check buttons. If a deletion button 703 is depressed in a checked state, a CGI program 603 for deleting the entry is started.

Reference numerals 704 and 705 denote regions for setting properties. In the region 704, an inspection timing property is set. In the region 705, a timeout property is set.

If patterns of a value which can be assumed as a configuration item value are determined as in the inspection timing property and a selection is effected from them, the patterns are displayed as a selection list as shown in 704.

If a default value is predetermined as in timeout, a default value is displayed beforehand as shown in 705. Reference numeral 706 is a button to be used after customizing of each field has been finished. By depressing this button, a CGI program 603 for generating the setting information file 2032 is started.

As shown in FIGS. 6 and 7, it becomes possible in the present embodiment to manage a new target product in the integrated management server 102 by adding the following that corresponds to the target product to be added:

setting information template;

XSL file 604; and

CGI program 603.

Furthermore, by preparing an install program 2083 on the target server 103 side, a new target product can be added to the integrated management system of the present embodiment.

As heretofore described, in the present embodiment, it becomes possible to easily add a new target product to the integrated management system.

Figure 8:
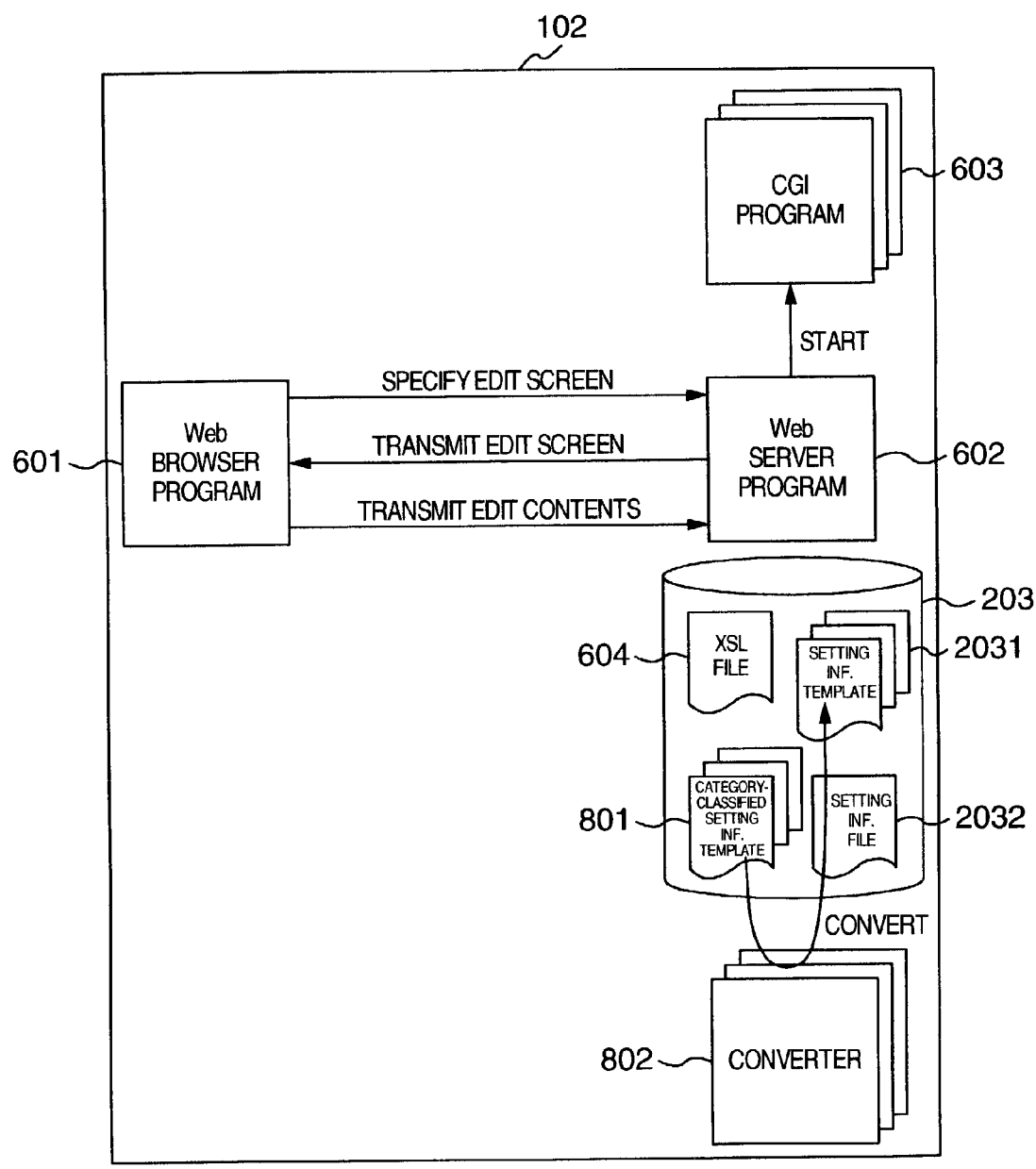
FIG. 8 is a diagram showing a configuration method of an edit program that lightens work of editing configuration items of a target product.

The configuration method of the edit program 2043 shown in FIG. 6 may be altered as shown in FIG. 8.

That is, a plurality of kinds of setting information templates 2031 having setting suitable default values, such as a plurality of settings corresponding to security policies of the user, are prepared. In addition, a CGI program 603 for making it possible for the user to effect a selection on these setting information templates is added.

As a result, it becomes possible to make only necessary items selectable and make items that have become unnecessary in setting unenterable. In addition, it becomes possible to implement various kinds of setting without omission and avoid unnecessary setting. It becomes possible to lighten the user's work of editing the configuration items of the target product.

In addition, instead of preparing a setting information template 2031 for each target product 2082, category-classified setting information templates 801 associated with kinds of target products, such as firewall products and intruder detection systems, and converters 802 for compensating different parts for respective products and creating information templates of respective products may be provided.

In the development of the integrated management system, the present embodiment brings about an effect that development items required when adding a target product are defined definitely and they can be implemented as independent modules, and an effect that the user's work of editing the configuration items of the target product.

As heretofore described, when expanding the management system in order to newly add a device that is not a management target or a new version as a management target, (1) definition of a template of a setting information file, which becomes a basis for setting a target product, (2) development of an edit program for editing the setting information file, and (3) development of an install program for installing the setting information file are conducted and then work of incorporating them into the management system is conducted.

Since this work can be conducted independently every individual target and the same technique can be applied to respective targets, it becomes easy to expand the management system.

Furthermore, since in the management system according to the present invention alteration procedures of setting contents for various targets are made common, it becomes possible to lighten the user's work.

It should be further understood by those skilled in the art that although the foregoing description has been made on embodiments of the invention, the invention is not limited thereto and various changes and modifications may be made without departing from the spirit of the invention and the scope of the appended claims.

We claim:

1. A management system comprising:
   a target server into which a target product is installed, the target product providing a security function; and
   a management server which manages the target product via a network,
   wherein the management server includes:
      a setting information template which is a base of a setting information file for the target product to be added as a management target such that the management server can manage the added target product; and
      a setting information generating means configured to meet with the target product for generating a setting information file to be set in the target server based on the setting information template,
   wherein the target server includes:
      operation means for operating the setting information generating means in the management server via the network; and
      setting means for receiving the setting information file generated by the setting information generating means which has been operated by the operation means and setting the setting information file in the target server;
   wherein the operation means in the target server includes Web browser means,
   the setting information file generating means in the management server includes Web server means, CGI means started by the Web server means, and a XSL file for generating an edit screen for the setting items corresponding to the target product, the edit screen being displayed by the Web browser means,
   the Web server means transmits the setting information template defined in a XML format and the XSL file to the Web browser means,
   the Web browser means displays an edit screen based on the received setting information template and the received XSL file,
   the Web browser means starts the CGI means through the Web server means based on an input operation on the edit screen, and
   the CGI means generates the setting information file based on the input operation.

2. The management system in accordance with claim 1, wherein the setting information template is defined in a XML format.

3. The management system in accordance with claim 1, wherein the Web browser means displays, on the edit screen, items to be set as the setting information file and default values for the items.

4. The management system in accordance with claim 1, wherein the management server further includes:
   category-classified setting information template filled with base setting information relating to a product category to which the target product belongs; and
   a converter for generating the setting information template for the target product from the category-classified setting information template.

* * * * *